(12) United States Patent
Jseng

(10) Patent No.: US 6,942,273 B1
(45) Date of Patent: Sep. 13, 2005

(54) VEHICLE BURGLAR-PROOF DEVICE BUILT IN ELECTROMOTIVE SEAT

(76) Inventor: Peter Ching Yeng Jseng, 235 Chung-Ho Box 8-24, Taipei (TW)

(*) Notice: Subject to any disclaimer, the term of this patent is extended or adjusted under 35 U.S.C. 154(b) by 0 days.

(21) Appl. No.: 10/818,128

(22) Filed: Apr. 6, 2004

(51) Int. Cl.⁷ .............................................. B60N 2/08
(52) U.S. Cl. .............................. 296/65.15; 296/68.13; 180/287; 188/265
(58) Field of Search ...................... 296/65.15, 68.13, 296/68.14; 248/429; 180/287; 297/217.1, 297/344.1; 188/265; 254/DIG. 5

(56) References Cited

U.S. PATENT DOCUMENTS

| | | | | |
|---|---|---|---|---|
| 1,738,769 A | * | 12/1929 | Fry | .............................. 254/123 |
| 3,650,347 A | * | 3/1972 | Campos | ...................... 180/282 |
| 4,632,209 A | * | 12/1986 | Russell | ....................... 180/287 |
| 4,660,878 A | * | 4/1987 | Neverson | .................... 296/1.05 |
| 4,747,465 A | * | 5/1988 | Hodgson | ..................... 180/287 |
| 5,213,388 A | * | 5/1993 | Baker | ....................... 296/65.13 |
| 5,412,964 A | * | 5/1995 | Yee | ............................. 70/261 |
| 5,529,372 A | * | 6/1996 | Cohen | ..................... 297/217.3 |
| 5,683,133 A | * | 11/1997 | Frusti et al. | ............. 296/65.12 |
| 6,048,019 A | * | 4/2000 | Tauber | .................... 296/65.13 |

* cited by examiner

Primary Examiner—Stephen Gordon

(57) ABSTRACT

A vehicle burglar-proof device comprises a base installed below a cushion of the seat; two tracks being arranged at two sides; the base being arranged across inner sides of two tracks; a mask enclosing a top and lateral sides of the base; a motor arranged within the base for driving the base to move along the two tracks; a control unit for conducting the motor. When a front side of the mask moves forwards to resist against a body of a vehicle, the controlling pedals will be isolated and the motor is interrupted so as to buckle and confine the base; and thus, the control pedals cannot be pressed so that they cannot be enabled.

4 Claims, 5 Drawing Sheets

VEHICLE BURGLAR-PROOF DEVICE BUILT IN ELECTROMOTIVE SEAT

FIELD OF THE INVENTION

The present invention relates to vehicle burglar-proof device, and particular to a vehicle burglar-proof device built in an electromotive seat, which can stop the control pedals so that the pedals cannot be operated so that the vehicle is burglar-proof.

BACKGROUND OF THE INVENTION

In the prior art, mechanic locks are used to lock the vehicles. For example, steering wheel locks serve to lock the steering wheels of vehicles; brake locks serve to lock the brake pedals; and switch gear locks serve to lock the switch gears so as to achieve the effect of burglar-proof. These locks have simple structures. Lock cores are easily destroyed so as not to work. Thereby, these locks only have the function of prolonging the time period of un-locking. Moreover, the users must lock and unlock the lock each time the car is stopped or driven. The operation is tedious.

Moreover, for another kind of vehicle locks which are installed within a vehicle body; cars include oil-interruption locks, power interruption locks, or switch locks. In these locks, a locking element of a lock core serves to lock the oil loops, switches or switch gears so as to achieve the object of burglar-proof. The installation process is very complicated. It is often that the components within the cars are detached for installing the locks. If faults occur in installation, maybe some accidents will occur.

SUMMARY OF THE INVENTION

Accordingly, the primary object of the present invention is to provide a vehicle burglar-proof device built in an electromotive seat, wherein the installing position and structure of the vehicle burglar-proof device will not affect the operation of the vehicle or electric devices. In use, the present invention can completely stop the control pedals so that the pedals can not be controlled. To achieve above objects, the present invention provides a vehicle burglar-proof device which comprises a base installed below a cushion of the seat; two tracks being arranged at two sides; the base being arranged across inner sides of two tracks; a mask enclosing a top and lateral sides of the base; a motor arranged within the base for driving the base to move along the two tracks; a control unit for conducting the motor; wherein when a front side of the mask moves forwards to resist against a body of a vehicle for isolating controlling pedals and interrupting the motor so as to buckle and confine the base; and thus, the control pedals cannot be pressed so that they cannot be enabled.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
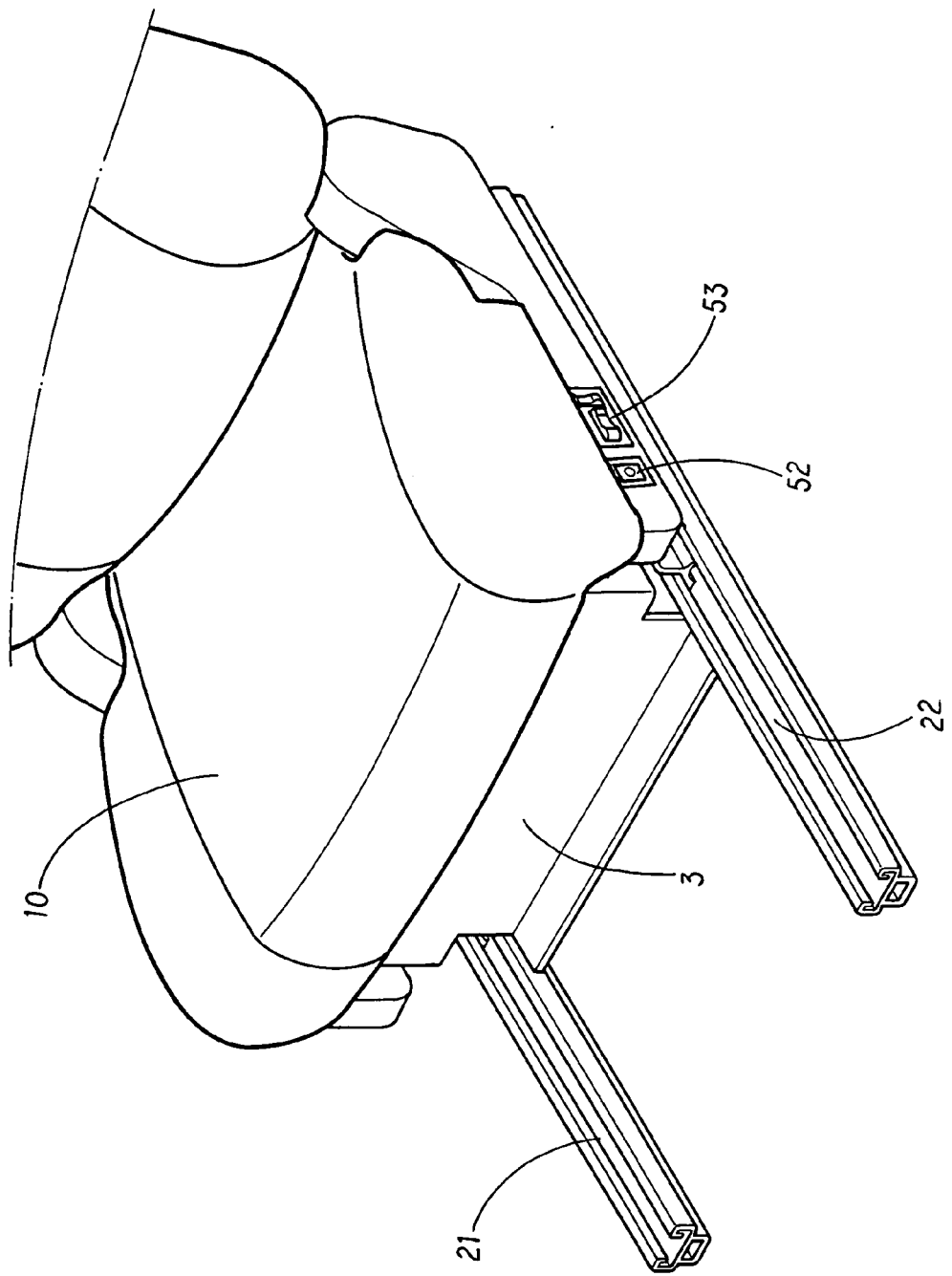
FIG. 1 is a perspective view of the present invention.
Figure 2:
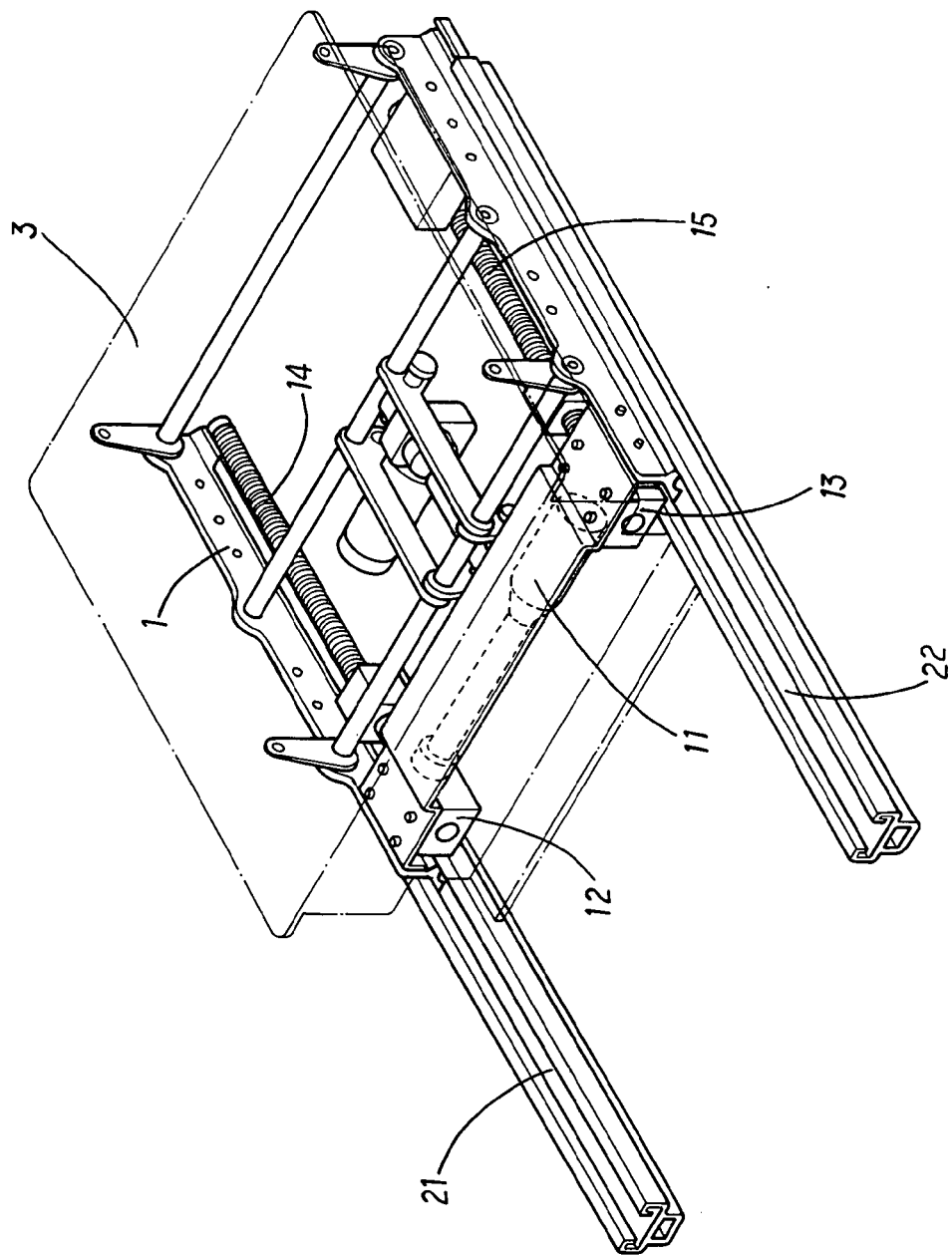
FIG. 2 shows the internal structure of the base according to the present invention.
Figure 3:
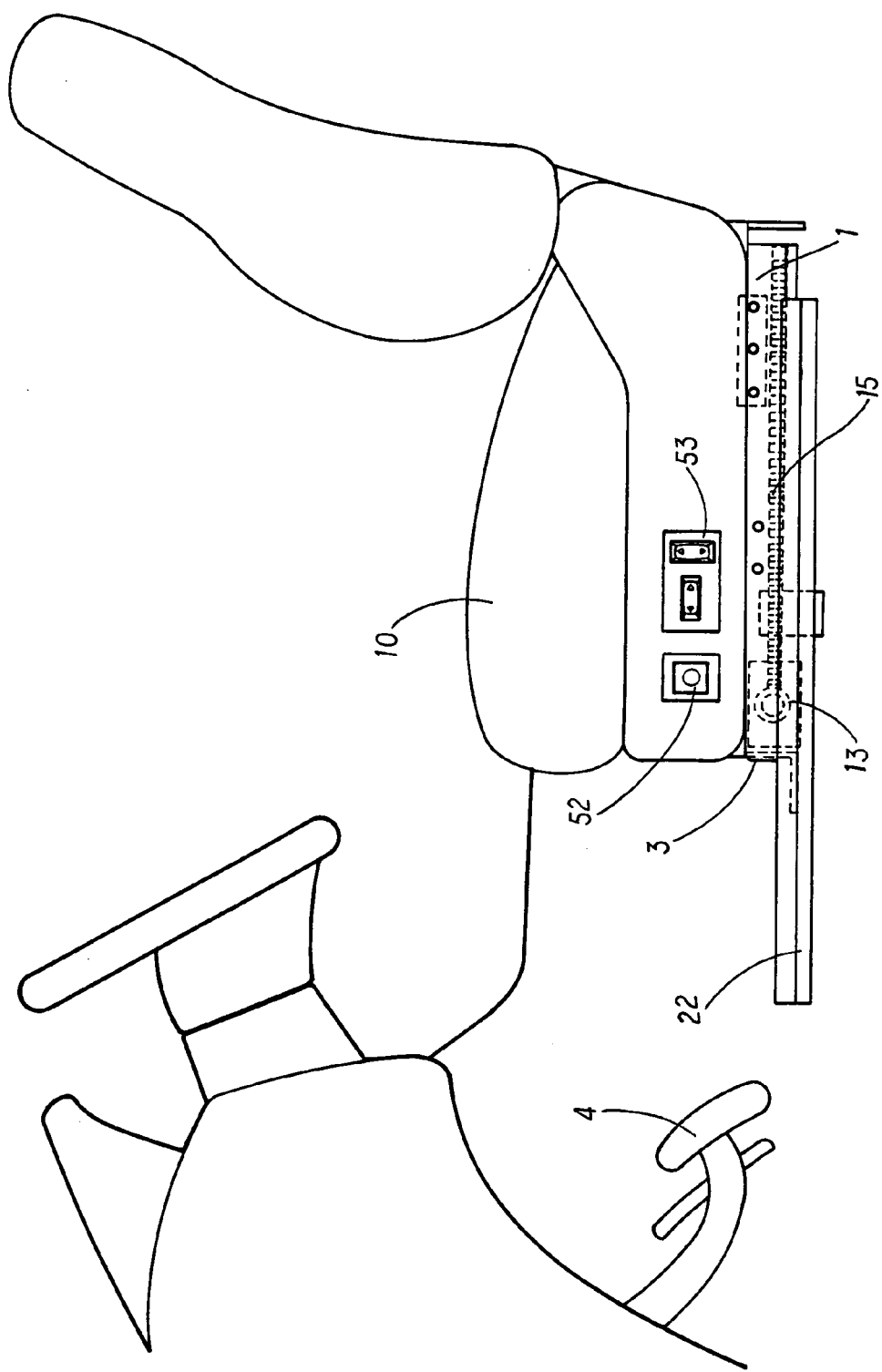
FIG. 3 is a schematic view showing that the base of the present invention moves forwards to resist against the control pedals.

With reference to FIGS. 1 to 3, the vehicle burglar-proof device built in an electromotive seat of the present invention is illustrated. The vehicle burglar-proof device is installed to a seat of a vehicle. The vehicle burglar-proof device comprises the following elements.

A base 1 is installed below a cushion 10 of the seat.

Two tracks 21, 22 are arranged at two sides of the base. The base 1 is arranged across inner sides of two tracks 21, 22.

Figure 4:
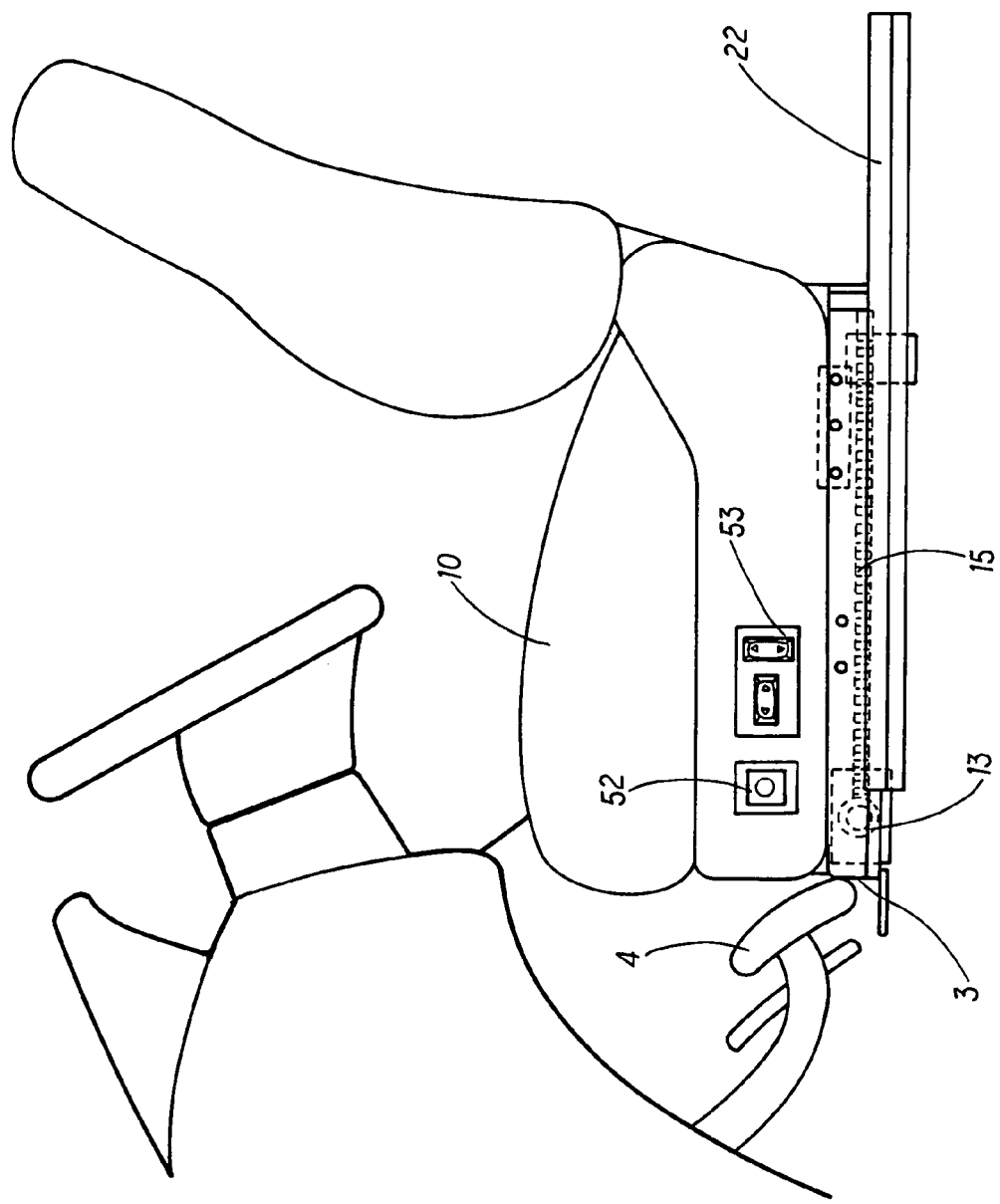
FIG. 4 shows the use of the present invention, wherein the control unit serves to control the displacement of the base.

A metal mask 3 encloses a top and lateral sides of the base 1. A motor 11 is arranged within the base 1 for driving the base 1 to move along the two tracks 21, 22. When a front side of the mask 3 moves forwards to resist against a body of a vehicle for isolating controlling pedals and interrupting the motor 11 so as to buckle and confine the base 1. As a result, the control pedals 4 cannot be pressed so that they cannot be enabled, referring to FIG. 4.

Figure 5:
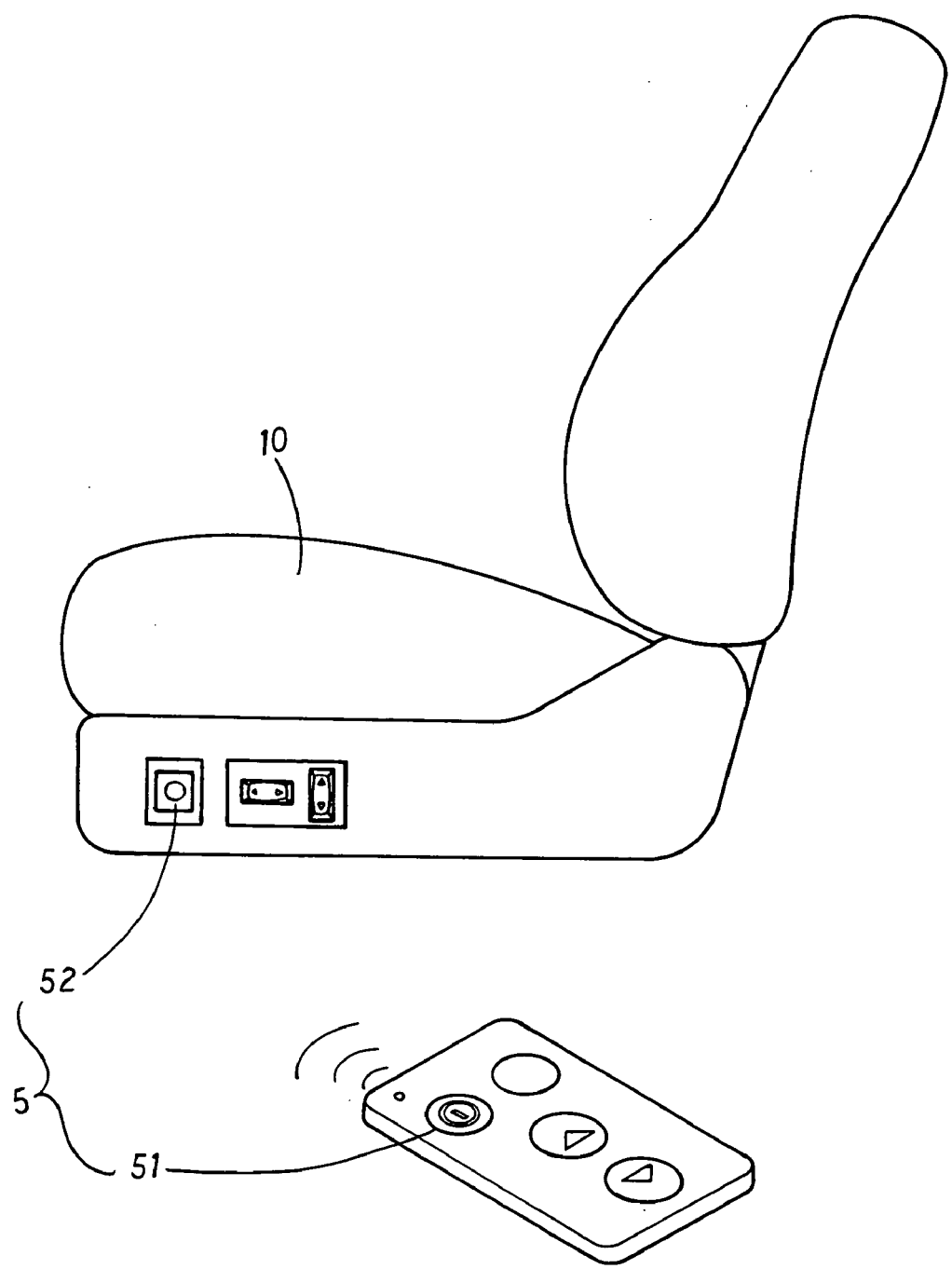
FIG. 5 shows one application of the present invention.

A control unit 5 serves to conduct the motor 11, as shown in FIG. 5.

From above description, it is known that the base 1 can stop and isolate the control pedals 4 so as to achieve the object of burglar-proof. The mask 3 serves to protect the circuit and parts of the base 1 so as not to be destroyed by external forces. The motor 11 of the base 1 has an independent power supply circuit. When the base 1 moves forwards to resist against the control pedals 4, the power of the motor 11 is interrupted. Thereby, even the vehicle is intruded and is actuated, the motor 11 of the base 1 has no power supplied. The actuation of the motor 11 is independent to other circuits of the vehicle. Thereby, when the base 1 resists against the control pedals 4, the control pedals 4 cannot be pressed so as to have a preferred burglar-proof effect.

In the present invention, two screw rods 14, 15 are at two sides of the base 1 which are coupled to two coupling boxes 12, 13, respectively.

With reference to FIGS. 2 to 5, in use, to assure the safety of the vehicle, the control unit 5 has two control modes. The displacement of the base 1 can be controlled singly or mutually. In one mode, a remote controller 51 serves to control the conduction of the motor 11 and displacement of the seat wirelessly. In another mode, a key switch 52 is installed at an outer side of the base 1. The key switch 52 can identify the fingerprints or ciphers of users. As the input fingerprints or ciphers are correct, the key switch 52 can be operated so as to actuate the motor 11. Then the adjuster 53 serves to move the base 1. Thereby, a personal control interface is achieved. The effects of safety and keeping secret are achieved.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A vehicle burglar-proof device comprising:
   a base installed below a cushion of a seat;
   two tracks being arranged at two sides of the base; the base being arranged across inner sides of said two tracks;
   a mask enclosing a top and lateral sides of the base;
   a motor arranged within the base for driving the base to move along the two tracks;
   a control unit for controlling the motor;
   wherein when a front side of the mask moves forwards to resist against a body of the vehicle, controlling pedals will be isolated and the motor is interrupted so as to buckle and confine the base; and thus, the controlling pedals cannot be pressed so that they cannot be enabled.

2. The vehicle burglar-proof device as claimed in claim 1, wherein the control unit is a remote controller for wirelessly controlling the actuation of the motor so as to move the base.

3. The vehicle burglar-proof device as claimed in claim 1, wherein the control unit is a key switch installed at an outer side of the base; the key switch serves to identify a user profile and then to actuate the motor.

4. The vehicle burglar-proof device as claimed in claim 1, wherein the motor is made of metal.

* * * * *

UNITED STATES PATENT AND TRADEMARK OFFICE
CERTIFICATE OF CORRECTION

PATENT NO. : 6,942,273 B1
DATED : September 12, 2005
INVENTOR(S) : Peter Ching Yeng Tseng It is certified that error appears in the above-identified patent and that said Letters Patent is hereby corrected as shown below:

<u>Title page,</u>
Item [76], Inventor, address should read -- 1910 Falls Landing Dr. Raleigh, NC 27614 --.

Signed and Sealed this

Thirteenth Day of December, 2005

JON W. DUDAS
*Director of the United States Patent and Trademark Office*